US007996972B2

(12) United States Patent
Hu

(10) Patent No.: US 7,996,972 B2
(45) Date of Patent: Aug. 16, 2011

(54) PULLER DRIVING STRUCTURE

(76) Inventor: Chih Kuo Hu, Taichung (TW)

( * ) Notice: Subject to any disclaimer, the term of this patent is extended or adjusted under 35 U.S.C. 154(b) by 0 days.

(21) Appl. No.: 11/985,000

(22) Filed: Nov. 26, 2007

(65) Prior Publication Data

US 2010/0251528 A1 Oct. 7, 2010

(51) Int. Cl.
*B23P 19/04* (2006.01)

(52) U.S. Cl. ................................ 29/252; 29/259; 29/255

(58) Field of Classification Search .................... 29/252, 29/259, 255, 261, 262, 267, 283

See application file for complete search history.

(56) References Cited

U.S. PATENT DOCUMENTS

| | | | | |
|---|---|---|---|---|
| 1,394,129 | A * | 10/1921 | Wickersham | 29/261 |
| 1,513,031 | A * | 10/1924 | Brown | 29/259 |
| 3,372,457 | A * | 3/1968 | Selby et al. | 29/259 |
| 5,233,740 | A * | 8/1993 | Chen | 29/252 |
| 5,302,078 | A * | 4/1994 | Essick et al. | 414/811 |
| 5,419,027 | A * | 5/1995 | McPeak et al. | 29/252 |
| 5,896,639 | A * | 4/1999 | Chen | 29/261 |
| 6,266,861 | B1 * | 7/2001 | Chen | 29/261 |
| 6,665,918 | B1 * | 12/2003 | Williams | 29/259 |
| 6,895,646 | B1 * | 5/2005 | Houg | 29/252 |
| 7,322,087 | B1 * | 1/2008 | Hu et al. | 29/261 |
| 7,526,847 | B1 * | 5/2009 | Arthur et al. | 29/235 |
| 7,669,306 | B2 * | 3/2010 | Palka | 29/261 |
| 7,770,277 | B2 * | 8/2010 | Wridt | 29/261 |
| 7,849,574 | B2 * | 12/2010 | Dickinson | 29/252 |
| 2010/0251528 | A1 * | 10/2010 | Hu | 29/252 |

* cited by examiner

*Primary Examiner* — George Nguyen
(74) *Attorney, Agent, or Firm* — Rosenberg, Klein & Lee

(57) ABSTRACT

A puller driving structure is connected to a fixing module and a propping module for installing or removing a bearing, and the structure connects a hydraulic driving device with a connecting module, and the connecting module is connected to a plurality of slide rods and a plurality of resilient elements of a position resuming module, such that an actuating element is actuated on each slide rod, and the hydraulic driving device presses and moves the actuating element, and each resilient element presses and props the actuating element in an opposite direction to resume its original position, so as to achieve a better balance during the use of the puller driving structure provides a better concentricity for the bearing and the spindle.

23 Claims, 10 Drawing Sheets

PULLER DRIVING STRUCTURE

BACKGROUND OF THE INVENTION

1. Field of the Invention

The present invention relates to a puller driving structure, and more particularly to a puller driving structure capable of preventing the occurrence of a shifting during the installation of a bearing.

2. Description of the Related Art

Referring to FIG. 8 for a general tool used for installing or removing an axle device, the tool is a traditional bearing installing device, and the installing device 9 includes a screw rod 91, a driving portion 911 disposed at an end of the screw rod 91 for rotating the screw rod 91, a driving unit 93 screwed around the external periphery of the screw rod 91 for rotating the screw rod 91 and pushing a connecting base 92, and a plurality of push rods 94 connected to the connecting base 92. The screw rod 91 has a spring 95 disposed on the external periphery of the screw rod 91 and at an end away from the driving portion 911 for resuming the connecting base 92 into its original position, and the screw rod 91 has an axial connection unit 96 disposed at an end away from the driving unit 93 for connecting the screw rod 91 with an axle device 97.

During use, the screw rod 91 is fixed to the axle device 97 by the axial connection unit 96, and then the driving unit 93 is rotated to push the connecting base 92 to move in a direction towards the axle device 97, and drive each push rod 94 to move, so that each push rod 94 props and pushes a desired installing bearing 98 to embed and engage the bearing 98 onto the axle device 97.

However, this kind of manual driving device requires a driving unit 93 with a longer arm of force, but if the manual driving device is used in a narrow space, then the radius of gyration of the arm of force of the driving unit 93 will be too large, and thus causing the manual driving device unable to use.

Referring to FIGS. 9 and 10 for another improved installing device, the installing device 8 includes a screw rod unit 81 driven by a hydraulic pump, and an extension rod 811 disposed in the screw rod unit 81 and extended when the hydraulic pump is driven. The screw rod unit 81 includes a containing cylinder 82 screwed onto an end away from the hydraulic pump and having a plurality of equidistant slide grooves 821. The bottom of the containing cylinder 82 has a screw hole 822 for screwing a latch element 841 that is coupled to a coupling element 83, and the coupling element 83 is secured onto a spindle of an axle device 85.

The containing cylinder 82 includes a slide base 86 disposed therein, and the slide base 86 includes a containing cavity 861 disposed at an end of the extension rod 811 for containing the screw rod unit 81. The slide base 86 has a plurality of equidistant protruded wings 862 respectively corresponding to each slide groove 821 of the containing cylinder 82, and each protruded wing 862 is passed with a push rod 87, and a spring is installed between the slide base 86 and the bottom of the containing cylinder 82 for resuming the slide base 86 into its position, and each push rod 87 is screwed with an extension rod 871 to increase the length, and the containing cylinder 82 has a stop ring 89 screwed at an end away from the bottom.

During use as shown in FIG. 10, the coupling element 83 is secured onto a spindle of the axle device 85, and the containing cylinder 82 is latched with the coupling element 83 by a latch element 84 that is coupled with the bottom. After each push rod 87 is pushed towards the external periphery of the axle device 85, and the hydraulic pump is pressed to push the extension rod 811 in the screw rod 81, the slide base 86 is moved downward to further push a bearing 851 to be embedded and engaged with the axle device 85 for the installation.

The method of installing a bearing by a single spring to press the slide base is adopted in the installation process. Since only one spring is installed at the position of the spindle of the containing cylinder, each push rod of the slide base may be shifted due to the biased bearing occurred when the bearing is pressed. As a result, each push rod becomes less stable when the bearing is installed and pressed, and the common center of the bearing and the axle device may be deviated easily, and thus it is necessary to remove the bearing from the axle device by a tool and reinstall the bearing. However, the bearing may be damaged and the external periphery of a component such as the axle device may be worn out easily in the process.

SUMMARY OF THE INVENTION

Therefore, it is a primary objective of the present invention to overcome the foregoing shortcomings by providing a puller driving structure, wherein a plurality of slide rods and a resilient element sheathed onto each slide rod are provided for evenly dispersing the pressure exerted onto the driving rod when a bearing is installed or removed, such that the overall structure can have better concentricity and balance.

Another objective of the present invention is to disperse the pressure exerted onto the driving rod by each resilient element to balance the actuating element, such that the actuating element will not be deviated, and worn-outs can be prevented when the spindle and the bearing are installed or removed.

To achieve the foregoing objectives, the present invention provides a puller driving structure having a fixing module and a propping module for installing or removing a bearing, and the puller driving structure comprises:

a hydraulic driving device, having a body, a driving handle and a driving rod passed through the center of the body, and the body having an adjusting portion disposed outside the driving rod, and the driving handle being provided for extending or withdrawing the driving rod in the adjusting portion of the body;

a connecting module, sheathed and coupled to an adjusting portion of the body, and having a plurality of fixing holes;

an actuating element, disposed at the bottom of the connecting module, and having a plurality of through holes respectively corresponding to each fixing hole of the connecting module, and the center of the actuating element corresponding to the driving rod, and being provided for the driving rod to press and actuate the actuating element, and a plurality of support arms being extended outward from the center of the actuating element, and each support arm having a guide rail portion for installing the propping module;

a position resuming module, installed at the bottom of the actuating element, and including a plurality of slide rods, a plurality of resilient elements and a fixing plate, and each slide rod passing through each corresponding fixing hole of the connecting module and then passing through each corresponding resilient element in the direction towards the fixing plate, and the fixing plate having a plurality of fixing holes corresponding to each slide rod for passing each corresponding slide rod, and after each slide rod is passed through each corresponding fixing hole, each sliding rod is fixed to the fixing plate by a fixing element, and the fixing plate having a fixing portion disposed at the center of the bottom of the fixing plate for installing the fixing module.

DETAILED DESCRIPTION OF THE PREFERRED EMBODIMENTS

Figure 1:
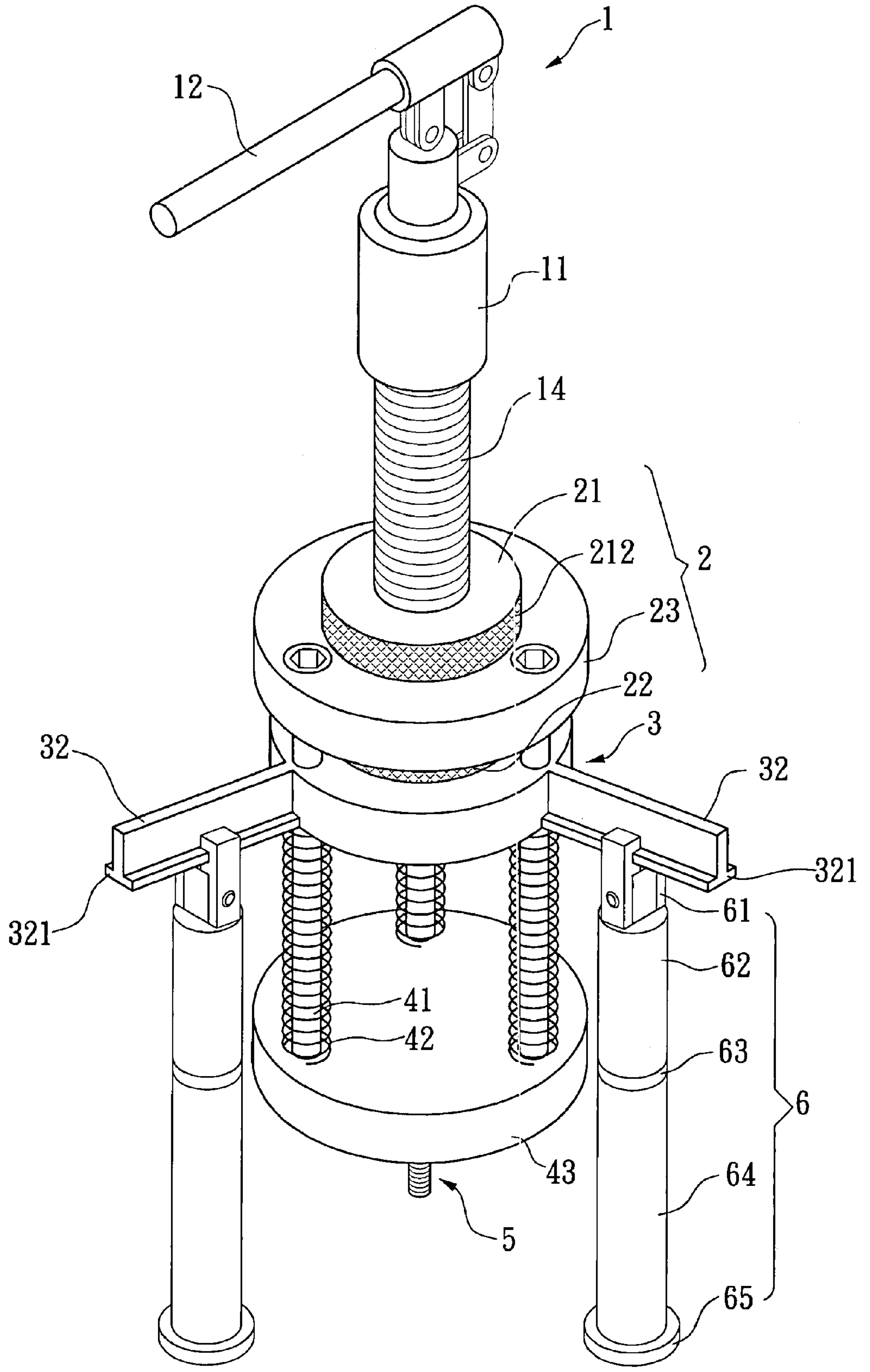
FIG. 1 is a perspective view of the present invention.
Figure 2:
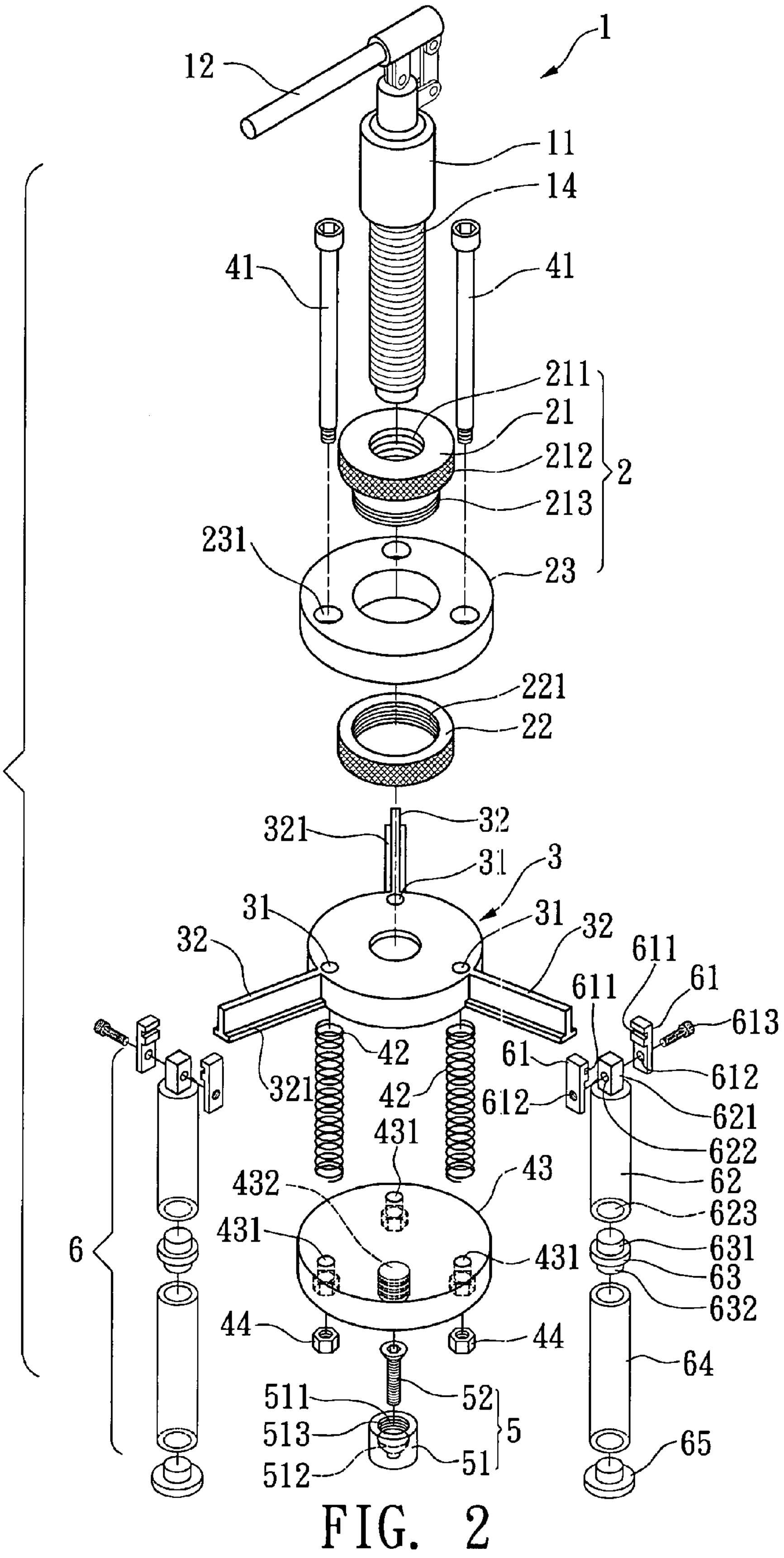
FIG. 2 is an exploded view of the present invention.

To make it easier for our examiner to understand the objective of the invention, its structure, innovative features, and performance, we use preferred embodiments together with the attached drawings for the detailed description of the invention.

Refer to FIGS. 1 to 7 for the preferred embodiments of the present invention, the embodiments are provided for the illustration purpose only, and not intended to limit the scope of the present invention.

This preferred embodiment provides a puller driving structure as shown in FIGS. 1 to 4 for installing or removing a bearing, the puller driving structure comprises:

a hydraulic driving device 1, having a body 11, a driving handle 12, and a driving rod 13 disposed at the center of the body 11, and the body 11 having an adjusting portion 14 disposed at the exterior of the driving rod 13, and the adjusting portion 14 being an external thread section in this embodiment, and the driving handle 12 being provided for the driving rod 13 to extended or contract in the adjusting portion 14 of the body 11;

a connecting module 2, having a first ring element 21, a second ring element 22 and a third ring element 23, and the first ring element 21 having a first thread section 211 for screwing and connecting the adjusting portion 14 of the hydraulic driving device 1, and the external periphery of the first ring element 21 having a rotating portion 212 which is an embossed section of the rotating portion 212;

each of the first ring element 21 and the second ring element 22 having a second thread section 213, 221 screwed with each second thread section 213, 221, and a fixing space formed between the first and second ring elements 21, 22 for clamping the third ring element 23, and the third ring element 23 having a plurality of fixing holes 231, and the third ring element 23 of this embodiment having three equidistant fixing holes 231;

an actuating element 3, installed at the bottom of the connecting module 2, and having a plurality of through holes 31 corresponding to each fixing hole 231 of the third ring element 23 of the connecting module 2 in this embodiment, and the actuating element 3 having three through holes 31, and the center of the actuating element 3 corresponding to the driving rod 13, such that the driving rod 13 can press the actuating element 3 for the actuation, and the actuating element 3 having a plurality of support arms 32 extended from the center to the outside, and each support arm 32 having a guide rail portion 321;

a position resuming module 4, installed at the bottom of the actuating element 3, and having a plurality of slide rods 41, a plurality of resilient elements 42 and a fixing plate 43, wherein each slide rod 41 is passed through each fixing hole 231 from the third ring element 23 of the connecting module 2, and then passed through each resilient element 42 of the fixing plate 43, and each resilient element 42 is a spring in this embodiment, and the diameter of each resilient element 42 is greater than the diameter of each through hole 31 for pressing the actuating element 3, and the fixing plate 43 corresponding to each slide rod 41 has a plurality of fixing holes 431 for passing each slide rod 41, and after each slide rod 41 is passed through each fixing hole 431, each slide rod 41 is fixed onto the fixing plate 43 by a fixing element 44, and the fixing element 44 is a screw nut in this embodiment, and the fixing plate 43 has a fixing portion 432 which is an external thread section in this embodiment.

The present invention adopts a fixing module 5 and a propping module 6 for the implementation of the preferred embodiment, wherein the fixing module 5 and the propping module 6 are described as follows:

The fixing module 5 includes a socket element 51 and a connecting element 52, and the connecting element 52 is a screw in this embodiment, and the socket element 51 is passed through a connecting hole 511, and has a retaining section 512 and a joint section 513 disposed sequentially from the bottom to the top of the connecting hole 511, and the joint section 513 is an internal thread section in this embodiment, and the joint section 513 of the socket element 51 is installed at the fixing portion 432 of the position resuming module 4, and a camber is disposed around the retaining section 512 for retaining the head of the connecting element 52, and the head of the connecting element 52 corresponds to the camber, and the connecting element 52 is extended and passed into the connecting hole 511 and slid in the camber of the retaining section 51.

The propping module 6 includes a plurality of pairs of clamping elements 61 (wherein the quantity of clamping elements matches the quantity of slide rods, and this embodiment uses three pairs of clamping elements), and each clamping element 61 has a clamping portion 611 and a locking hole 512, and each clamping portion 611 is slid, fixed and clamped at a guide rail portion 321 of each support arm 32 of each actuating element 3, and each locking hole 612 is provided for locking a prop rod 62.

The prop rod 62 includes a connecting section 621 disposed at an end of the prop rod 62 and corresponding to the locking hole 612 of each clamping element 61, and the connecting section 621 is substantially rectangular in shape, and the connecting section 621 has a through hole 622 for lacking and fixing a locking hole 612 of each clamping element 61 by a locking element 613. The prop rod 62 has a connecting hole 623 disposed axially on a distal surface at an end of the connecting section 621 for installing a connecting element 63, and the connecting element 63 has a first distal end 631 and a second distal end 632, and the first distal end 631 is connected to the connecting hole 623 of the prop rod 62, and the second distal end 632 is connected to an extension rod 64, and the diameter of the first distal end 631 and the second distal end 632 of the connecting element 63 is smaller than the diameter of the connecting hole 623 of the prop rod 62, and the bottom of the extension rod 64 is connected to a propping cushion 65 having a flat bottom, for increasing the overall length of the propping module 6. Since the body of the propping cushion 65 comes with a specific length, therefore it may not need to install the extension rod 64 according to user requirements, but the propping cushion 65 can be installed directly to the connecting hole 623 of the prop rod 62 to achieve the effect of the extension rod.

Figure 3:
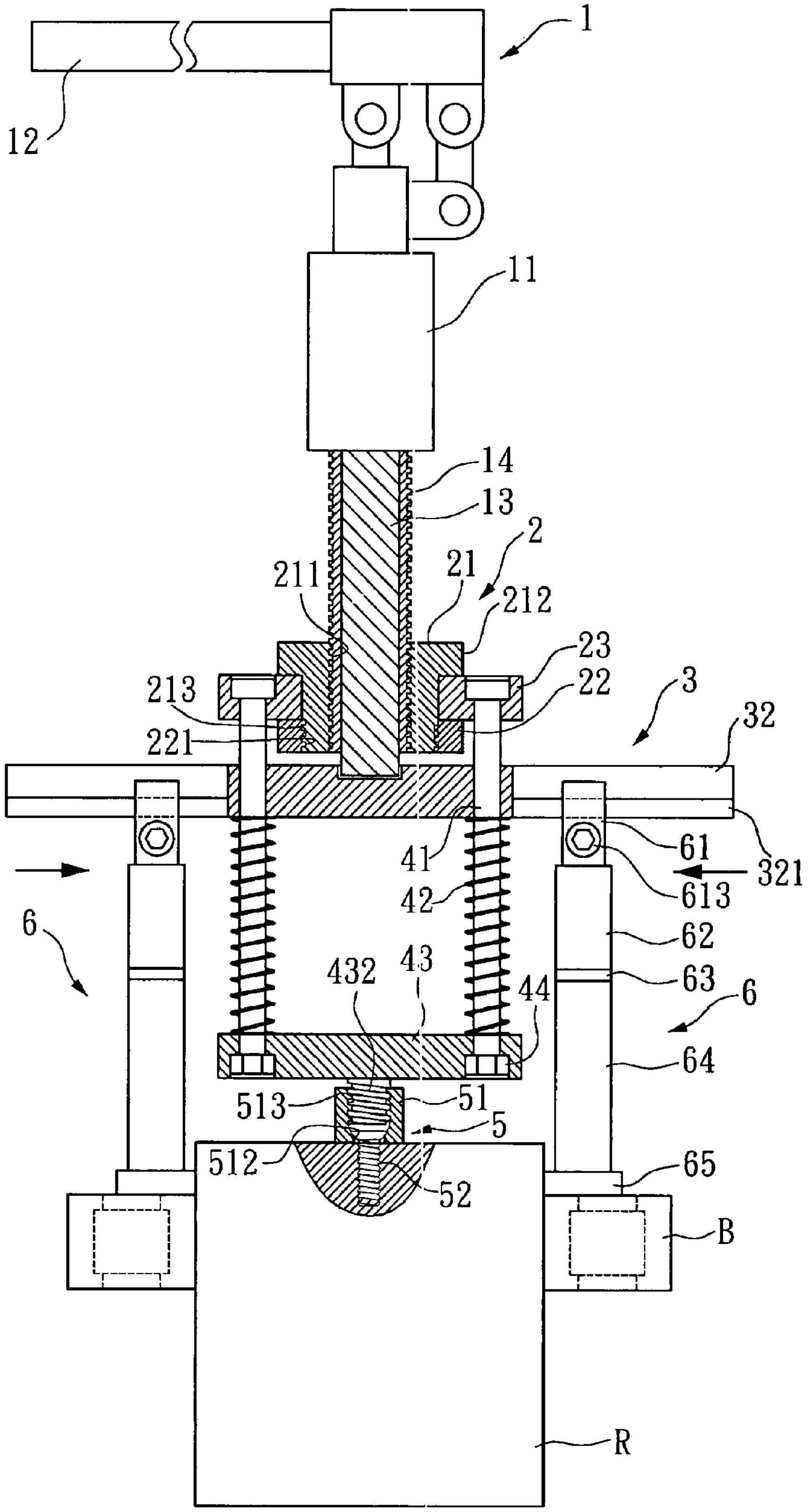
FIG. 3 is a cross-sectional view of an assembly of the present invention.

In summation of the description above, a user installs a spindle R at a bearing B as shown in FIG. 3 and described below: Firstly, the hydraulic driving device 1 is adjusted by rotating the rotating portion 212 of the first ring element 21 of the connecting module 2, such that the connecting module 2 is moved at the adjusting portion 14 of the hydraulic driving device 1, and the actuating element 3 is situated proximate to the hydraulic driving device 1, and the driving rod 13 is situated proximate to the central position of the actuating element 3.

Figure 4:
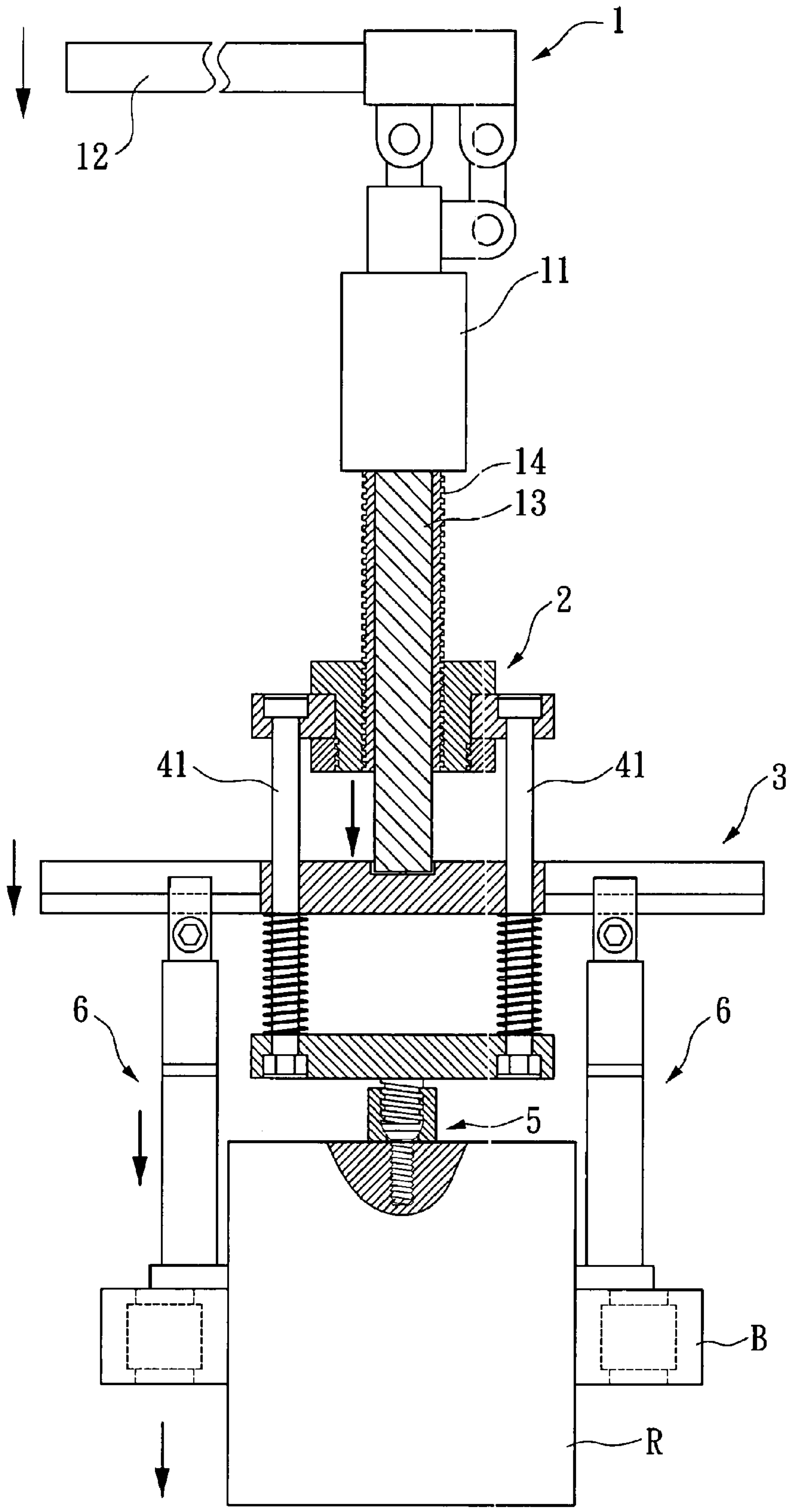
FIG. 4 is a schematic view of using the present invention.

Further, the connecting element 52 of the fixing module 5 is passed and connected into the retaining section 512 of the socket element 51, and locked at a screw hole disposed at the central position of the spindle R, and the joint section 513 of the socket element 51 is screwed to the fixing portion 432 of the fixing plate 43 of the position resuming module 4, and then each prop rod 62 of the propping module 6 is leaned towards the spindle R along the guide rail portion 321 of each support arm 32 of the actuating element 3, and each prop rod 62 is fixed to the guide rail portion 321 of each support arm 32 by each clamping element 61. Finally, the driving handle 12 of the hydraulic driving device 1 is pressed as shown in FIG. 4, such that the lower end of the driving rod 13 of the hydraulic driving device 1 is pressed at the central position of the actuating element 3, while the driving rod 13 is being pressed against the actuating element 3 to prop downward. Now, since the actuating element 3 is passed through each slide rod 41, the actuating element 3 is moved along each slide rod 41 in a direction towards the fixing module 5 to drive each prop rod 62 of the propping module 6 to press and push the bearing B to be engaged with the spindle R.

Since the driving rod 13 is used for driving the actuating element 3, pressure coming from the driving rod 13 and in two opposite directions of each resilient element 42 is exerted onto the actuating element 3. When the driving rod 13 is used for installing the bearing, a plurality of resilient elements 42 is used for dispersing the pressure exerted onto the driving rod 13 to balance the actuating element 3, so that the actuating element 3 will not be deviated, and the spindle R and the bearing B will have better concentricity and balance, and the spindle R and the bearing B will not be worn out easily.

Figure 5:
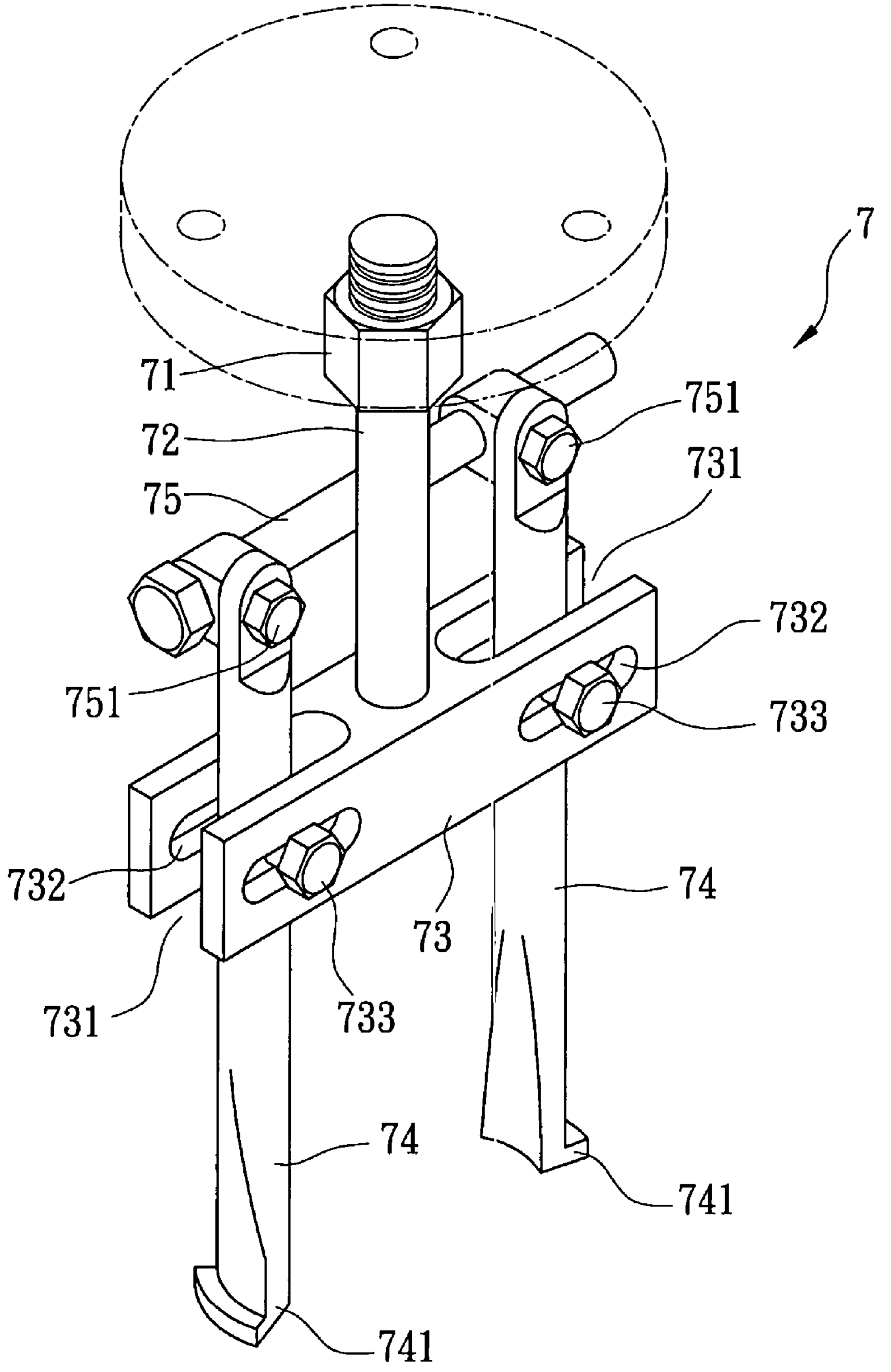
FIG. 5 is a perspective view of a fixing module of a second preferred embodiment of the present invention.
Figure 6:
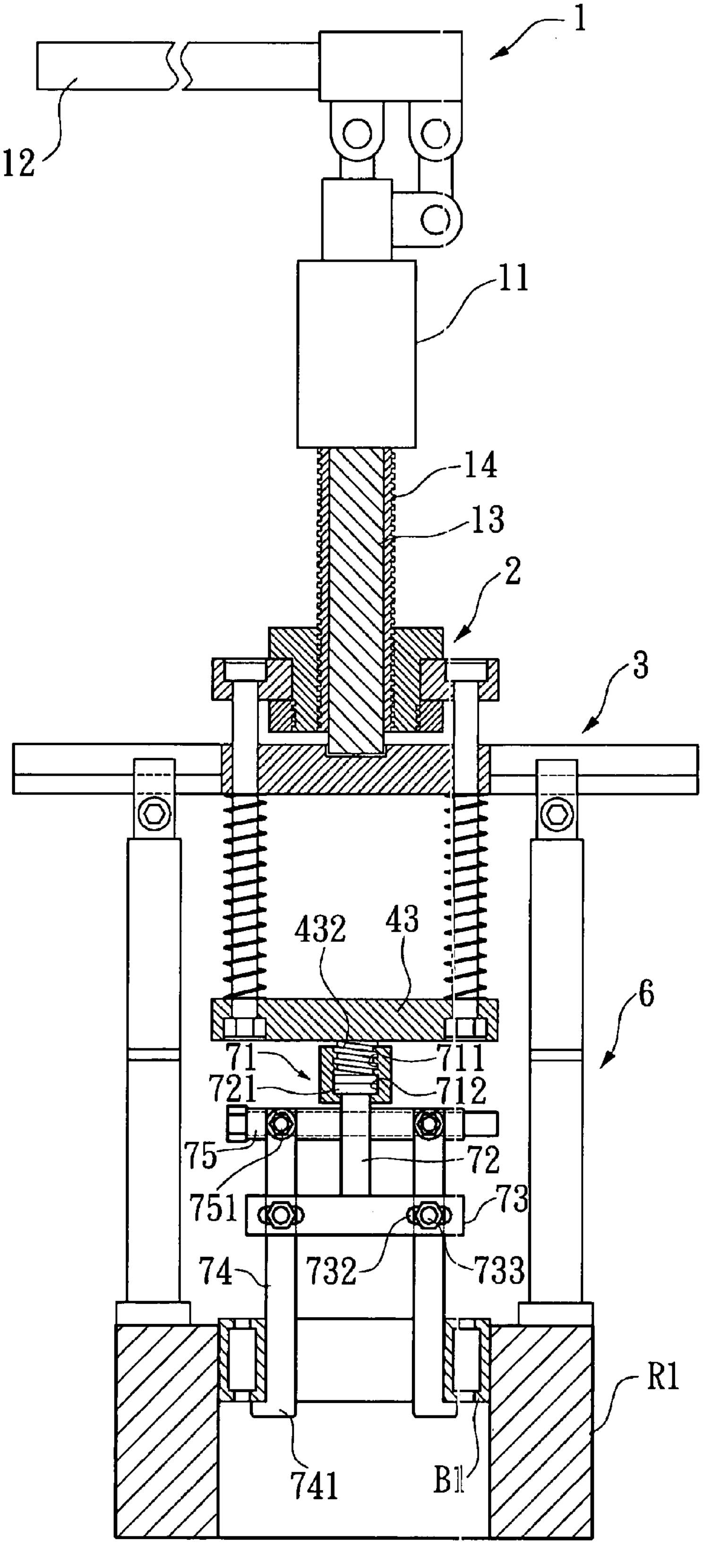
FIG. 6 is a cross-sectional view of an assembly of a second preferred embodiment of the present invention.

Of course, other embodiments as shown in FIGS. 5 and 6 can be used for illustrating a second preferred embodiment of the present invention, wherein the fixing portion 432 of the fixing plate 43 of the position resuming module 4 is connected to a fixing module 7, and the fixing module 7 is used for removing a bearing B1 situated inside a spindle R1.

The fixing module 7 includes a connecting lump 71 screwed at the fixing portion 432 of the fixing plate 43, a connecting rod 72 latched to the connecting lump 71, a fixing rod 73 fixed to the connecting rod 72, two pull rods 74 installed at both ends of the fixing rod 73 respectively, and an adjusting rod 75 installed at the top of each pull rod 74.

The connecting lump 71 includes a joint section 711 and a latching section 712, and the joint section 711 is an internal thread section screwed and coupled to the fixing portion 432 in this embodiment. The connecting rod 72 has a latch portion 721 passed and coupled to the latching section 712 of the connecting lump 71 and latched inside the latching section 712 such that the connecting rod 72 can move together with the connecting lump 71. Both ends of the fixing rod 73 separately have a cut groove 731, and both sides of each cut groove 731 separately have a slide groove 732, and each cut groove 731 contains a pull rod 74, and each pull rod 74 has a hook portion 741 disposed at an end away from the adjusting rod 75 and extended in an opposition direction towards the outside.

Each slide groove 732 is passed with a plurality of positioning elements 733, and each positioning element 733 is provided for adjusting and fixing each pull rod 74 in each cut groove 731, such that each pull rod 74 can be slid and pivotally swung in each cut groove 731, and then each positioning element 733 is used for fixing each pull rod 74 in each cut groove 731. Both ends of the adjusting rod 75 separately have an adjusting element 751 for installing and fixing each pull rod 74 onto the adjusting rod 75.

Figure 7:
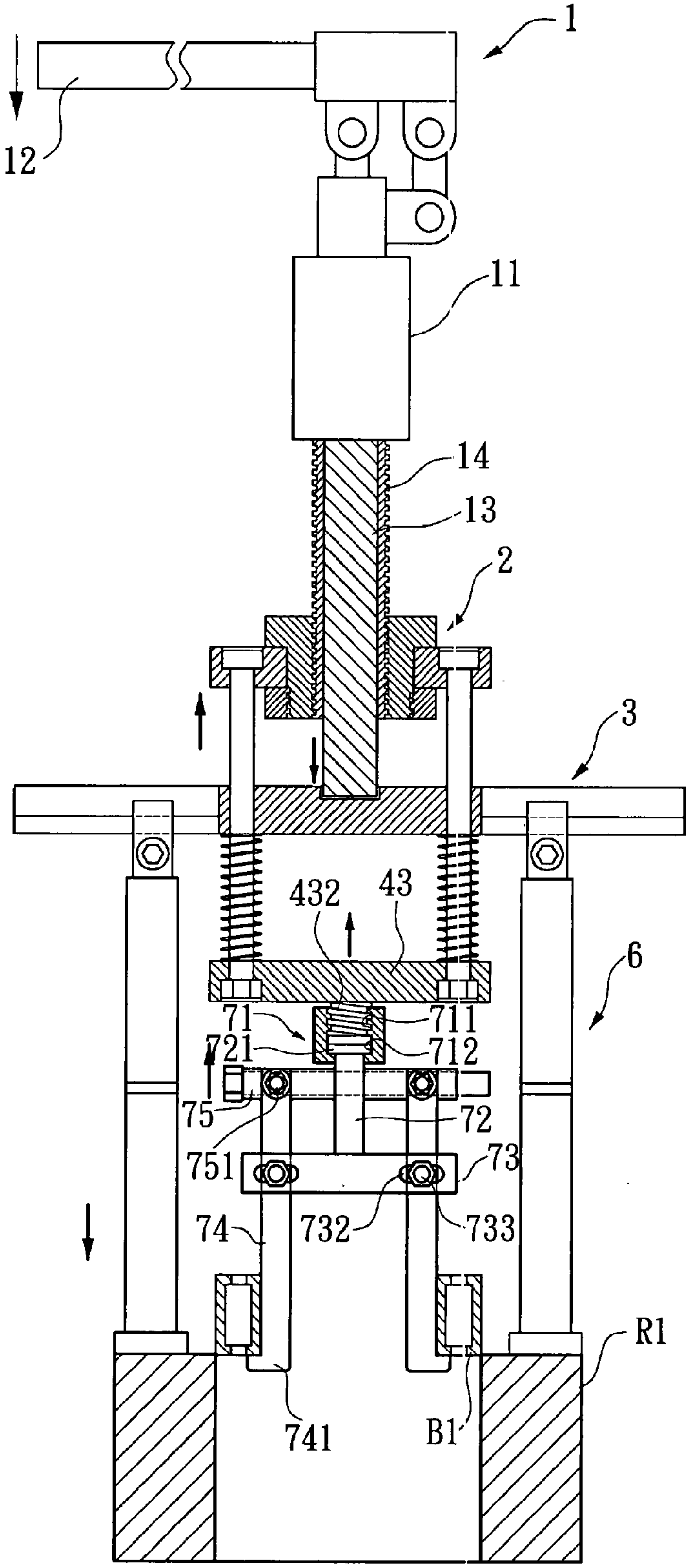
FIG. 7 is a schematic view of using a second preferred embodiment of the present invention.
Figure 8:
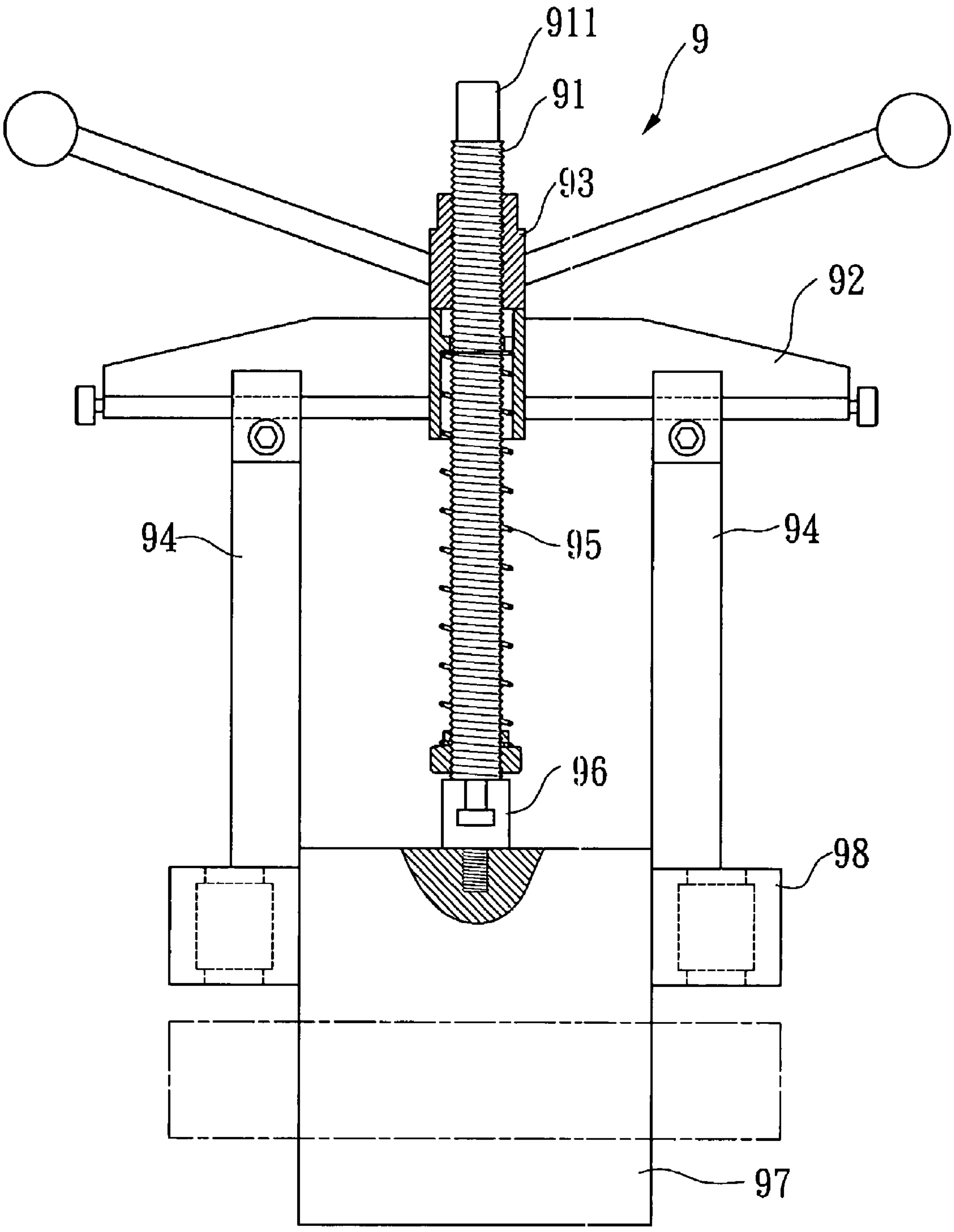
FIG. 8 PRIOR ART
FIG. 8 is a cross-sectional view of a first prior art puller.
Figure 9:
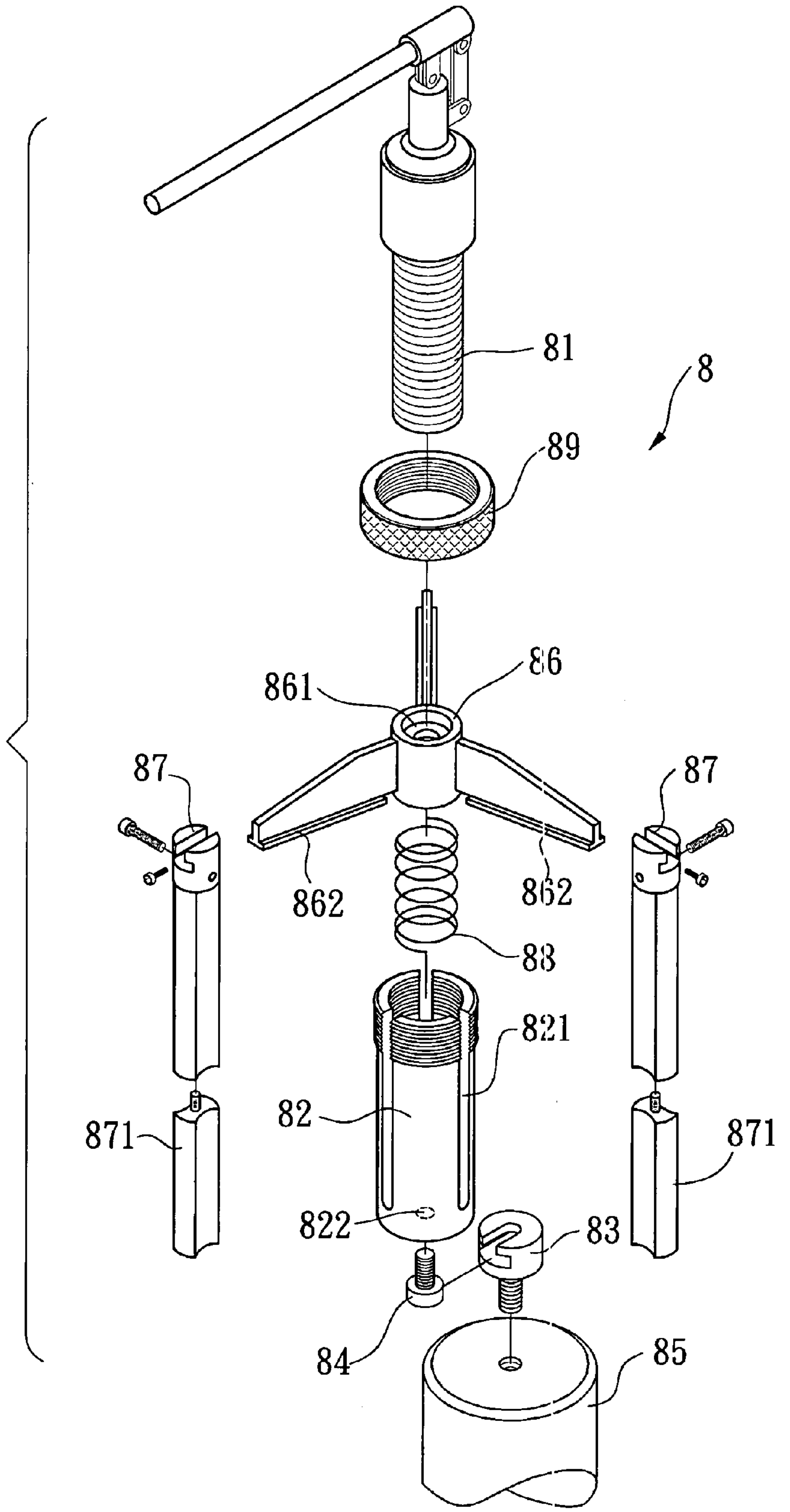
FIG. 9 PRIOR ART
FIG. 9 is an exploded view of a second prior art puller.
Figure 10:
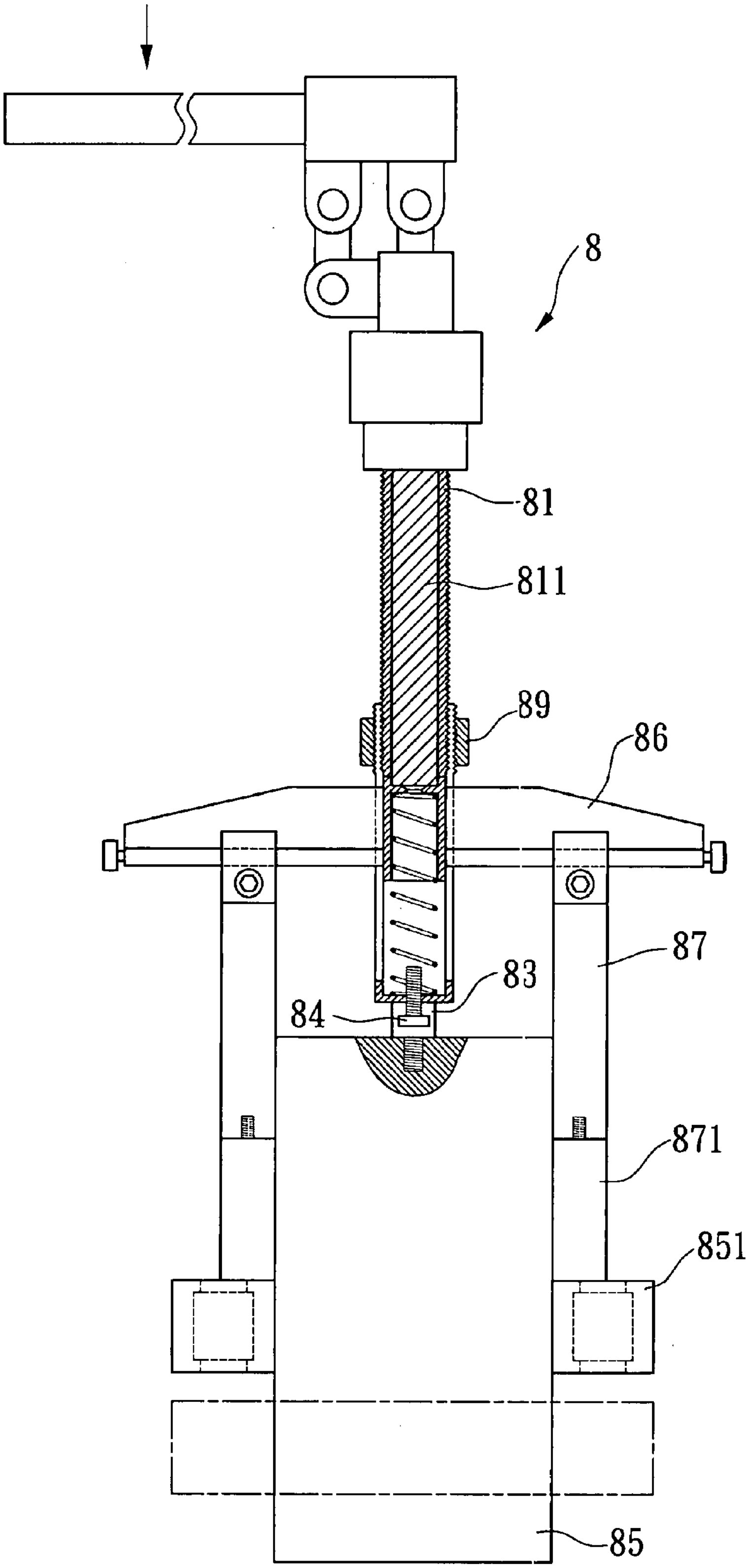
FIG. 10 PRIOR ART
FIG. 10 is a sectional view of a second prior art puller.

Referring to FIG. 7 for the use of the fixing module 7 in accordance with a second preferred embodiment of the present invention, the relative positions of the hydraulic driving device 1 and the actuating element 3 are adjusted, and then each hook portion 741 of two pull rods 74 of the fixing module 7 is passed and coupled to the center of the bearing B1. Now, each positioning element 733 and each adjusting element 751 are loosened, such that after each pull rod 74 is leaned to the internal circumference of the bearing B1, each positioning element 733 and each adjusting element 751 are secured and fixed, and then the propping module 6 is pressed against a distal surface of the spindle R1, and finally the driving rod 13 of the hydraulic driving device 1 pushes the actuating element 3, so that the propping module 6 and the fixing module 7 are moved with respect to each other by the reaction produced by the driving rod 13 and the spindle R1 of the hydraulic driving device 1, and the bearing B1 is moved towards the external side of the spindle R1 for removing the bearing B1. The aforementioned procedure can remove the bearing B1.

In summation of the description above, the structure of the invention can be applied for installing a bearing as well as providing better concentricity and balance of the spindle and the bearing. The invention not just achieves the foregoing effects only, but also achieves the objectives of installing and removing the bearing.

While the invention has been described by means of specific embodiments, numerous modifications and variations could be made thereto by those skilled in the art without departing from the scope and spirit of the invention set forth in the claims.

What is claimed is:

1. A puller driving structure, connected to a fixing module and a propping module, for installing or removing a bearing, and the puller driving structure comprising:

a hydraulic driving device, having a body, a driving handle and a driving rod passed through the center of the body, and the body having an adjusting portion disposed at the exterior of the driving rod, and the driving handle being provided for the driving rod to extend or retract the adjusting portion of the body;

a connecting module, sheathed onto the adjusting portion of the body, and having a plurality of fixing holes;

an actuating element, installed at the bottom of the connecting module, and having a plurality of through holes corresponding to each fixing hole of the connecting module, and the center of the actuating element corresponding to the driving rod provided for the driving rod to press and actuate the actuating element, and the actuating element having a plurality of support arms extended from the center towards the outside, and each support arm having a guide rail portion for installing the propping module;

a position resuming module, installed at the bottom of the actuating element, and having a plurality of slide rods, a plurality of resilient elements and a fixing plate, and each slide rod passing through each fixing hole of the connecting module and having each resilient element passing towards the fixing plate, and the fixing plate having a plurality of fixing holes corresponding to each slide rod for installing each slide rod, and after each slide rod is extended and passed into each fixing hole, each slide rod is fixed onto the fixing plate by a fixing element, and a fixing portion being protruded from the center of the bottom of the fixing plate for installing the fixing module.

2. The puller driving structure of claim 1, wherein the adjusting portion is an external thread section provided for screwing and securing the connecting module.

3. The puller driving structure of claim 2, wherein the connecting module comprises a first ring element, a second ring element and a third ring element, and the first ring element has a first thread section provided for screwing and connecting the adjusting portion of the hydraulic driving device, and the first ring element has a rotating portion disposed at the external periphery of the first ring element, and each of the first ring element and the second ring element has a second thread section, and the second thread sections are screwed and locked with each other, and a fixing space is formed between the first and second ring elements for clamping the third ring element, and the third ring element has a plurality of fixing holes for installing each slide rod.

4. The puller driving structure of claim 3, wherein the rotating portion is an embossed section.

5. The puller driving structure of claim 3, wherein the third ring element has three equidistant fixing holes.

6. The puller driving structure of claim 1, wherein each resilient element has a diameter greater than the diameter of each through hole for pressing and propping the actuating element.

7. The puller driving structure of claim 1, wherein the actuating element includes three through holes.

8. The puller driving structure of claim 1, wherein each resilient element is a spring.

9. The puller driving structure of claim 1, wherein the fixing element is a screw nut.

10. The puller driving structure of claim 1, wherein the fixing portion of the fixing plate is an external thread section for screwing and coupling with the fixing module.

11. The puller driving structure of claim 10, wherein the fixing module includes a socket element and a connecting element, and the center of the socket element has a connecting hole, and the connecting hole has a retaining section and a joint section disposed sequentially from the bottom to the top of the connecting hole, and the joint section of the socket element is provided for screwing and coupling the fixing portion of the position resuming module, and the retaining section has a camber disposed around the retaining section for retaining a head of the connecting element, and the head of the connecting element matches with the camber, and the connecting element is extended into the connecting hole and can be slid in the camber of the retaining section.

12. The puller driving structure of claim 11, wherein the connecting element is a screw.

13. The puller driving structure of claim 11, wherein the joint section is an internal thread section.

14. The puller driving structure of claim 10, wherein the fixing module includes a connecting lump screwed at the fixing plate fixing portion, a connecting rod latched at the connecting lump, a fixing rod fixed at the connecting rod, two pull rods installed at both ends of the fixing rod respectively, and an adjusting rod disposed at the top of each pull rod, and each pull rod has a hook portion disposed at an end away from the adjusting rod and extended in an opposite direction towards the outside.

15. The puller driving structure of claim 14, wherein the connecting lump includes a joint section and a latching section, and the joint section is provided for screwing at the fixing portion, and the connecting rod has a latch portion passed and coupled at the latching section of the connecting lump and moves together with the connecting lump.

16. The puller driving structure of claim 15, wherein the joint section is an internal thread section.

17. The puller driving structure of claim 14, wherein the fixing rod includes a cut groove disposed separately on both ends of the fixing rod, and both sides of each cut groove separately have a slide groove, and each cut groove contains a pull rod, and each slide groove is passed with a plurality of positioning elements, and each positioning element is provided for adjusting and fixing each pull rod into each cut groove, such that each pull rod can be slid and pivotally swung in each cut groove, and then fixed into each cut groove of each pull rod by each positioning element.

18. The puller driving structure of claim 14, wherein the adjusting rod has an adjusting element disposed separately at both ends of the adjusting rod for connecting each pull rod and fixing onto the adjusting rod.

19. The puller driving structure of claim 1, wherein the propping module includes a plurality of pairs of clamping elements, and each clamping element has a clamping portion and a locking hole, and each clamping portion is slid, fixed and clamped at a guide rail portion of each support arm of each actuating element, and each locking hole is provided for locking a prop rod.

20. The puller driving structure of claim 19, wherein the prop rod has a connecting section disposed at an end of the prop rod and matched with each clamping element locking hole, and the connecting section has a through hole for locking and fixing the locking hole of each clamping element by a locking element.

21. The puller driving structure of claim 19, wherein the prop rod has a connecting hole disposed axially at a distal surface of an end of the connecting section for installing a connecting element, and the connecting element includes a first distal end and a second distal end, and the first distal end is coupled with the connecting hole of the prop rod, and the second distal end is connected to an extension rod.

22. The puller driving structure of claim 21, wherein, the bottom of the extension rod is coupled with a propping cushion.

23. The puller driving structure of claim 22, wherein, the propping cushion comes with a body of a specific length.

* * * * *